(12) United States Patent
Heo et al.

(10) Patent No.: US 12,676,089 B2
(45) Date of Patent: Jul. 7, 2026

(54) ELECTRONIC SHELF LABEL AND CONTROLLING METHOD THEREFOR

(71) Applicant: SOLUM CO., LTD., Gyeonggi-do (KR)

(72) Inventors: Jae Gun Heo, Gyeonggi-do (KR); Chung Hee Lee, Gyeonggi-do (KR); Do Sang Kwon, Gyeonggi-do (KR); Woo Seok Han, Gyeonggi-do (KR); Chan Lee, Gyeonggi-do (KR); Ji Hoon Kim, Gyeonggi-do (KR); Bo Il Seo, Gyeonggi-do (KR)

(73) Assignee: SOLUM CO., LTD., Gyeonggi-do (KR)

( * ) Notice: Subject to any disclaimer, the term of this patent is extended or adjusted under 35 U.S.C. 154(b) by 214 days.

(21) Appl. No.: 18/290,286

(22) PCT Filed: Jan. 20, 2023

(86) PCT No.: PCT/KR2023/001022
§ 371 (c)(1),
(2) Date: Nov. 10, 2023

(87) PCT Pub. No.: WO2023/140686
PCT Pub. Date: Jul. 27, 2023

(65) Prior Publication Data
US 2024/0071262 A1 Feb. 29, 2024

(30) Foreign Application Priority Data

Jan. 20, 2022 (KR) ........................ 10-2022-0008791
Jan. 19, 2023 (KR) ........................ 10-2023-0008100

(51) Int. Cl.
*G09F 3/20* (2006.01)
*G06Q 30/02* (2023.01)

(52) U.S. Cl.
CPC ......... *G09F 3/208* (2013.01); *G06Q 30/0281* (2013.01)

(58) Field of Classification Search
CPC ............. G09F 3/208; G06K 19/07707; H04W 52/0225
See application file for complete search history.

(56) References Cited

U.S. PATENT DOCUMENTS 10,083,390 B2 9/2018 Kim
10,555,155 B2 * 2/2020 Taylor ..................... H04W 4/80
(Continued)

FOREIGN PATENT DOCUMENTS

KR 10-1452117 10/2014
KR 10-2015-0026263 3/2015
(Continued)

OTHER PUBLICATIONS

Notice of Allowance dated Jan. 20, 2025 for Korean Patent Application No. 10-2023-0008100 and its English translation from Global Dossier.
(Continued)

*Primary Examiner* — Gary C Hoge
(74) *Attorney, Agent, or Firm* — WOMBLE BOND DICKINSON (US) LLP

(57) ABSTRACT

An electronic price indicator according to an embodiment includes a display displaying product information, an NFC module configured to communicate with a user terminal, a Bluetooth module configured to communicate with the user terminal, and a processor configured to control the display to display the product information received from the user terminal through the Bluetooth module. The processor is further configured to release a sleep mode when receiving an interrupt from the user terminal through the NFC module, and perform Bluetooth communication with the user termi-
(Continued)

nal by initiating a scan for a predetermined period of time to receive an advertising signal from the user terminal.

15 Claims, 6 Drawing Sheets

(56) References Cited

U.S. PATENT DOCUMENTS

| 2018/0077124 | A1* | 3/2018 | Ramoutar | H04L 9/0891 |
|---|---|---|---|---|
| 2018/0279103 | A1 | 9/2018 | Hong | |
| 2019/0156270 | A1* | 5/2019 | Karmakar | G06Q 10/087 |
| 2020/0402429 | A1 | 12/2020 | Cho et al. | |
| 2022/0240184 | A1* | 7/2022 | Rössl | H04W 52/0219 |
| 2024/0130539 | A1* | 4/2024 | Schwarz | A47F 10/02 |

FOREIGN PATENT DOCUMENTS

| KR | 10-2016-0045995 | 4/2016 |
|---|---|---|
| KR | 10-2016-0052046 | 5/2016 |
| KR | 10-2016-0060815 | 5/2016 |
| KR | 10-2017-0025769 | 3/2017 |
| KR | 10-2018-0120494 | 11/2018 |
| KR | 10-2020-0145179 | 12/2020 |

OTHER PUBLICATIONS

International Search Report for PCT/KR2023/001022 mailed on May 8, 2023 and its English Machine Translation by the WIPO (now published as WO 2022/215922).
Written Opinion of the International Searching for PCT/KR2023/001022 mailed on May 8, 2023 and its machine Translation by the WIPO (now published as WO 2022/215922).

* cited by examiner

FIG. 2

ELECTRONIC SHELF LABEL AND CONTROLLING METHOD THEREFOR

CROSS-REFERENCE TO RELATED APPLICATIONS

The present application is the U.S. National Phase of PCT Application No. PCT/KR2023/001022 filed on Jan. 20, 2023, which claims the priority to Korean Patent Application No. 10-2022-0008791 filed on Jan. 20, 2022, and Korean Patent Application No. 10-2023-0008100 filed on Jan. 19, 2023 the entire contents of which are incorporated herein by reference.

TECHNICAL FIELD

Embodiments relate to an electronic price indicator and a control method of the same, and more particularly, to an electronic price indicator capable of reducing power consumption, and a control method of the electronic price indicator.

BACKGROUND ART

An electronic price indicator refers to an e-paper terminal that displays information, such as price and country of origin, for each product in real time through a wireless communication network, on a store product shelf. An electronic price indicator is referred to as an electronic shelf label (ESL). Due to use of electronic price indicators, desired information may be displayed at any time without having to frequently replace paper price tags. Recently, the market of various distribution stores such as hypermarkets, supermarkets, health and beauty (H&B), and fashion stores, is growing.

An electronic price indicator system is composed of a gateway in charge of wired/wireless communication and a tag device displaying product information. When an ESL central management server transmits product information to the gateway by using Internet of Things (IoT) technology, the gateway transmits the product information to several ESL tags through wireless communication. Text, barcodes, photos, etc. are displayed on a tag.

An electronic paper display, which is used in electronic price indicators, is a technology capable of replacing paper functions with existing displays such as electronic liquid crystal displays (LCDs) and light-emitting diodes (LEDs). Power consumption is small, and stored information may be viewed even when the power is off.

Efficiency in store management can be improved by automatically reflecting inventory status, price changes, discount periods, and etc. for each product in all stores at the same time by using electronic price indicators. Stores can save money spent on price tag printing, etc.

DISCLOSURE

Technical Problem

In an electronic price indicator, as in a general Bluetooth communication connection, such as Bluetooth Low Energy (BLE), when a user terminal, for example, a smartphone, is determined as a master or a scanner, and an electronic price indicator is determined as a slave or advertiser, the electronic price indicator needs to advertise periodically for connection. This causes power consumption, and is excessively inefficient during off-peak hours. In addition, the electronic price indicator is subject to interference from other devices conforming to the BLE standard. Moreover, because an electronic price indicator has to continuously advertise, unnecessary power consumption is generated.

Provided are an electronic price indicator capable of reducing power consumption, and a control method of the electronic price indicator, thereby reducing unnecessary consumption for BLE communication with a user terminal.

The problems to be solved through embodiments of the disclosure are not limited to the aforementioned problems, and problems not mentioned will be clearly understood by those of ordinary skill in the art to which embodiments belong from the present specification and the accompanying drawings.

Technical Solution

According to an aspect of the disclosure, an electronic price indicator includes a display displaying product information, an NFC module configured to communicate with a user terminal, a Bluetooth module configured to communicate with the user terminal, and a processor configured to control the display to display the product information received from the user terminal through the Bluetooth module.

The processor is further configured to release a sleep mode when receiving an interrupt from the user terminal through the NFC module, and perform Bluetooth communication with the user terminal by initiating a scan for a predetermined period of time to receive an advertising signal from the user terminal.

The processor may be further configured to search for a unique connection key included in the advertising signal, and perform a Bluetooth connection with the user terminal, based on a found unique connection key.

The processor may be further configured to return to the sleep mode when the unique connection key is not found from the advertising signal for the predetermined period of time.

The processor may be further configured to transmit information of the electronic price indicator to the user terminal through the NFC module according to the interrupt from the user terminal.

The information of the electronic price indicator may include a media access control (MAC) address, a tag type, and a unique connection key.

The processor may be further configured to transmit a connection request to the user terminal when a unique connection key included in the advertising signal from the user terminal is found.

When a tag type included in the connection request is consistent with a tag type received through the NFC module, the Bluetooth communication with the user terminal may be maintained.

When a MAC address included in the connection request is consistent with a MAC address received through the NFC module, the Bluetooth communication with the user terminal may be maintained.

The processor may be further configured to generate the interrupt according to an NFC touch of the user terminal, and the generated interrupt may trigger the Bluetooth module.

According to another aspect of the disclosure, a control method of an electronic price indicator includes releasing a sleep mode when receiving an interrupt from a user terminal through an NFC module; initiating a scan for a predetermined period of time to receive an advertising signal from the user terminal; and performing Bluetooth communication with the user terminal.

The control method may further include searching for a unique connection key included in the advertising signal, and performing a Bluetooth connection with the user terminal, based on a found unique connection key.

The control method may further, when the unique connection key is not found from the advertising signal for the predetermined period of time, returning to the sleep mode.

The control method may further, when the unique connection key included in the advertising signal from the user terminal is found, transmitting a connection request to the user terminal.

In the control method, when a tag type included in the connection request and a tag type received through the NFC module are consistent with each other and a MAC address included in the connection request and a MAC address received through the NFC module are consistent with each other, the Bluetooth communication may be maintained.

According to another aspect of the disclosure, a computer-readable recording medium has recorded thereon a program for executing the control method.

Advantageous Effects

Provided are an electronic price indicator capable of reducing power consumption, and a method of controlling the electronic price indicator, thereby reducing unnecessary consumption for BLE communication with a user terminal.

The effects of embodiments are not limited to the aforementioned effects, and effects not mentioned will be clearly understood by those of ordinary skill in the art to which embodiments belong from the present specification and the accompanying drawings.

DESCRIPTION OF DRAWINGS

FIG. 2 is a schematic view of an electronic price indicator according to an embodiment.

MODE FOR INVENTION

Figure 1:
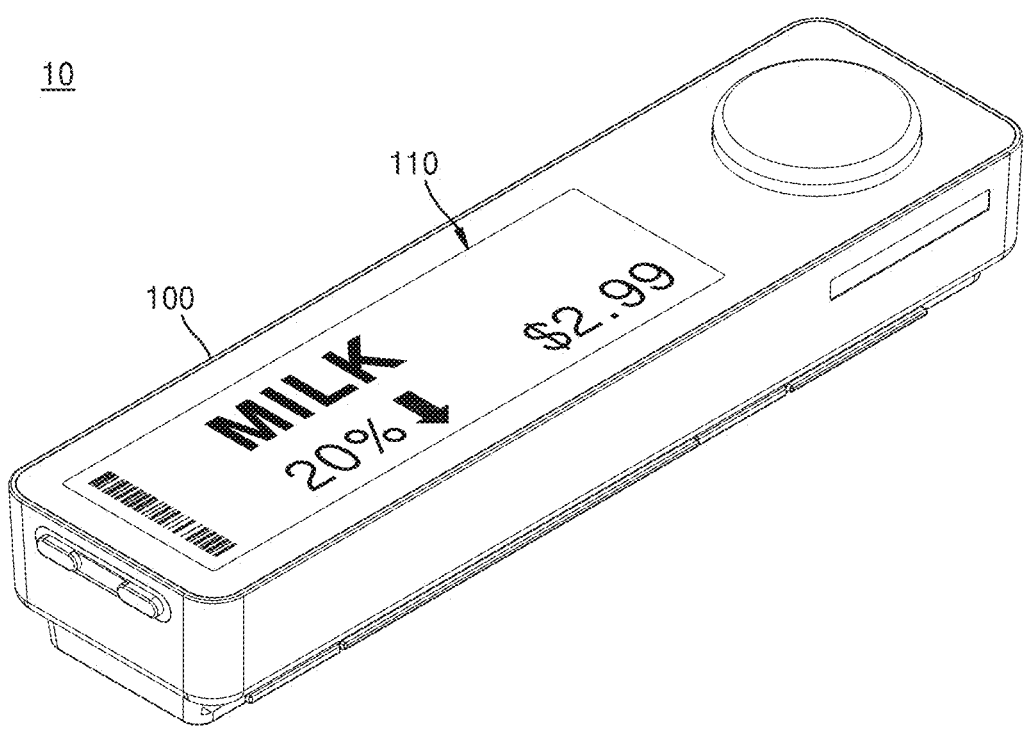
FIG. 1 is a perspective view of an electronic price indicator according to an embodiment.

Although general terms widely used at present were selected for describing the disclosure in consideration of the functions thereof, these general terms may vary according to intentions of one of ordinary skill in the art, case precedents, the advent of new technologies, and the like. Terms arbitrarily selected by the applicant of the disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms "unit", "-er (-or)", and "module" when used in this specification refers to a unit in which at least one function or operation is performed, and may be implemented as hardware, software, or a combination of hardware and software.

Expressions such as "at least one of," when preceding a list of elements, modify the entire list of elements and do not modify the individual elements of the list. For example, the expression "at least one of a, b, or c" should be interpreted as including a, b, c, a and b, a and c, b and c, or a and b and c.

Embodiments of the disclosure are described in detail herein with reference to the accompanying drawings so that this disclosure may be easily performed by one of ordinary skill in the art to which the disclosure pertains. The disclosure may be implemented as a type realizable in the aerosol generating devices of the above-described various embodiments or may be implemented as various different types, and is not limited to the embodiments described herein.

According to an embodiment, an "electronic price indicator" is a device that displays specific information, such as product name, price, and barcode, on a plastic tag, and is also referred to as a so-called electric shelf label (ESL) (hereinafter, referred to as an ESL). A method of installing gateway-related software at a place where an electronic price indicator is needed, and setting and applying the contents to be expressed on the electronic price indicator may be used. The gateway serves as a public communication network with computers, when the network and several electronic price indicators interconnect with each other. For example, the gateway acts as a medium between the electronic price indicator, a store POS machine, and a product information management server, and product information is exchanged and displayed to consumers on a display of the electronic price indicator, such as an electronic paper or an electronic panel, through the medium. The electronic paper (e-paper) is a display device that has a similar texture to that of ordinary paper, does not hurt eyes even when viewed for a long time, and is capable of free writing and erasing on the screen. Power consumption is low, and electronic ink (e-ink), which is the core of electronic paper, has a memory effect so that e-paper is maintained even when electricity is cut off.

According to an embodiment, a "user terminal" may be implemented as a computer or portable terminal capable of accessing a server or other terminals through a network. The computer may include, for example, a notebook, a desktop, a laptop, and a VR HMD (e.g., HTC VIVE, Oculus Rift, GearVR, DayDream, or PSVR) equipped with a web browser. The VR HMD may include all of stand alone models (e.g., Deepon and PICO) implemented independently of PC models (e.g., HTC VIVE, Oculus Rift, FOVE, or Deepon), mobile models (e.g., GearVR, DayDream, Stormtrooper, or Google Cardboard), and console models (PSVR). The portable terminal is, for example, a wireless communication device that ensures portability and mobility, and may include not only smartphones, tablet PCs, and wearable devices, but also various devices equipped with communication modules, such as Bluetooth Bluetooth Low Energy (BLE), NFC, RFID, and ultrasonic waves, infrared, Wi-Fi (WiFi), and Li-Fi (LiFi). The "network" refers to a connection structure capable of exchanging information between nodes, such as terminals and servers, and examples of the network includes a local area network (LAN), a wide area network (WAN), the Internet (WWW: World Wide Web), a wired and wireless data communications network, a telephone network, and a wired and wireless television communications network. Examples of the wireless data communication network include, but are not limited to, 3G, 4G, 5G, 3rd Generation Partnership Project (3GPP), Long Term Evolution (LTE), World Interoperability for Microwave Access (WIMAX), Wi-Fi, Bluetooth communication, infrared communication, ultrasonic communication, visible light communication (VLC), and LiFi.

FIG. 1 is a perspective view of an electronic price indicator according to an embodiment.

Referring to FIG. 1, an electronic price indicator 10 according to an embodiment may be disposed on or coupled to a product shelf in a distribution space to display information about a product (hereinafter, referred to as product information). For example, the electronic price indicator 10 may receive product information from a server (not shown) and visually display the product information received from the server, thereby providing the product information to a user. The electronic price indicator 10 may be referred to as an electronic shelf label (ESL) or an electronic information label (EIL), according to embodiments.

According to an embodiment, the electronic price indicator 10 may include a housing 100 and a display 110.

The housing 100 may form the overall appearance of the electronic price indicator 10, and components of the electronic price indicator 10 may be disposed in the inner space of the housing 100. For example, a printed circuit board (not shown) including a processor for controlling an operation of the electronic price indicator 10, a communication module (not shown) for wireless communication with the server, and/or a battery (not shown) may be disposed in the inner space of the housing 100, but embodiments are not limited thereto.

According to an embodiment, the housing 100 may be formed in a rectangular parallelepiped shape as a whole as shown in FIG. 1, but the shape of the housing 100 is not limited to the illustrated embodiment. According to another embodiment, the housing 100 may be formed in a polygonal column shape in addition to a rectangular parallelepiped shape.

The display 110 may be disposed such that at least one region is exposed through an outer circumferential surface of the housing 100, and may output visual information. For example, the display 110 may output product information received from the server, but embodiments are not limited thereto. In the disclosure, product information may include at least one of price information, a manufacturer, a country of origin, discount information, or identification information (e.g., a barcode or QR code), and the corresponding expression may be used in the same meaning below.

The display 110 may output the product information through power supplied from a battery accommodated in the inner space of the housing 100.

Figure 2:
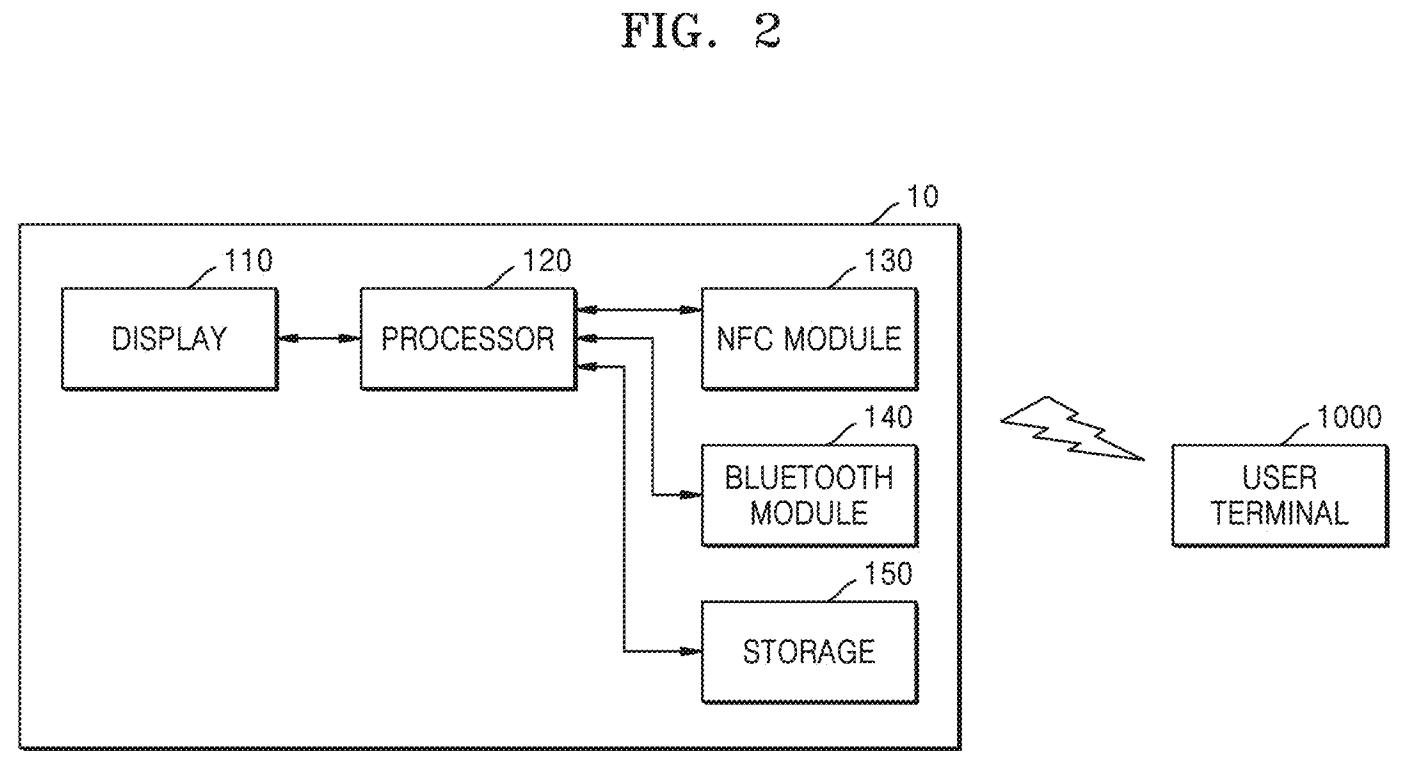

FIG. 2 is a schematic diagram of the electronic price indicator 10 according to an embodiment.

Referring to FIG. 2, the electronic price indicator 10 performs wireless communication with a user terminal 1000. According to an embodiment, the electronic price indicator 10 may perform short-range wireless communication including near field communication (NFC) (hereinafter, referred to as NFC) communication, and Bluetooth communication with the user terminal 1000. According to an embodiment, the user terminal 1000 may replace or change information to be displayed on the electronic price indicator 10, for example, product information or price information, in real time, by using wireless communication.

The electronic price indicator 10 includes the display 110, a processor 120, an NFC module 130, a Bluetooth module 140, and a storage 150.

The display 110 is a device for displaying product information, and may be electronic paper or e-paper. The product information may include price information, a manufacturer, a country of origin, discount information or identification information, and a barcode or QR code.

The processor 120 controls all operations of the electronic price indicator 10. The processor 120 controls the display 110, the NFC module 130, the Bluetooth module 140, and the storage 150.

According to an embodiment, the processor 120 may display, on the display 110, product information received from the user terminal 1000 through the Bluetooth module 140. When receiving an interrupt from the user terminal 1000 through the NFC module 130, the processor 120 releases a sleep mode. The processor 120 initiates a scan for a predetermined time to receive an advertising signal from the user terminal 1000, and performs Bluetooth communication with the user terminal 1000.

According to an embodiment, the processor 120 searches for a unique connection key included in the advertising signal of the user terminal 1000, and performs a Bluetooth connection with the user terminal 1000, based on a found unique connection key. At this time, when the user's own connection key is not found from the advertising signal for the predetermined period of time, the processor 120 may return to the sleep mode.

According to an embodiment, the processor 120 may transmit information of the electronic price indicator 10 to the user terminal 1000 through the NFC module 130 according to an interrupt or NFC tag or touch from the user terminal 1000. The information of the electronic price indicator 10 may include a media access control (MAC) address, a tag type, and a unique connection key. In other words, the user terminal 1000 may read the MAC address, the tag type, the unique connection key, etc. of the electronic price indicator 10 through an NFC tag. Then, when the user terminal 1000 broadcasts the advertising signal while operating as a slave of Bluetooth communication, the user terminal 1000 may include the read unique connection key in the advertising signal and transmit the read unique connection key included in the advertising signal, and, only when the unique connection key included in the advertising signal from the user terminal 1000 is found, the processor 120 may transmit a connection request to the user terminal 1000.

Only when a tag type or MAC address included in the connection request of the electronic price indicator 10 is consistent with the tag type or MAC address read or received through the NFC tag, the user terminal 1000 may maintain the connection request of the electronic price indicator 10.

According to an embodiment, the processor 120 may generate an interrupt according to an NFC touch of the user terminal 1000, and the generated interrupt triggers the Bluetooth module 130, thereby reducing power consumption of the electronic price indicator. In other words, when there is no NFC interrupt, the electronic price indicator 10 may maintain a power saving state or the sleep mode.

The NFC module 130 is a wireless communication module through which two electronic devices may communicate with each other at a frequency of 13.56 MHz at a distance of 10 cm. The NFC module 120 may be an NFC tag or an NFC chip. The NFC module 130 is activated by an approach or touch of the user terminal 1000 having approached closely to the electronic price indicator 10.

The Bluetooth module 140 performs Bluetooth communication with the user terminal 1000. Bluetooth operating methods may be largely classified into the following two modes. An advertise mode is a device that unilaterally sends a signal to all nearby devices after power is applied. The advertise mode is a device such as a beacon unrelated to communication, and operates only in advertising channels, namely, 37, 38, and 39 channels, in a 2.4 GHz frequency band. The connection mode is an operation method that requires a process of connection between devices after an advertising packet is delivered. When devices are connected to each other, an advertiser and an observer operate in a frequency hopping method as a one-to-one operation.

A Bluetooth communication procedure between the Bluetooth module 140 and the user terminal 1000 will be described later with reference to FIG. 5.

The storage 150 stores necessary information, such as operation information and product information, of the electronic price indicator 10. The storage 150 may include at least one type of storage medium from among a flash memory type storage medium, a hard disk type storage medium, a multimedia card micro type storage medium, a card type memory (for example, SD or XD memory), a random access memory (RAM), a static RAM (SRAM), a read-only memory (ROM), an electrically erasable programmable ROM (EEPROM), a programmable ROM (PROM), a magnetic memory, a magnetic disk, and an optical disk.

A Bluetooth communication process between a conventional electronic price indicator and a user terminal will be described with reference to FIG. 4.

Figure 4:
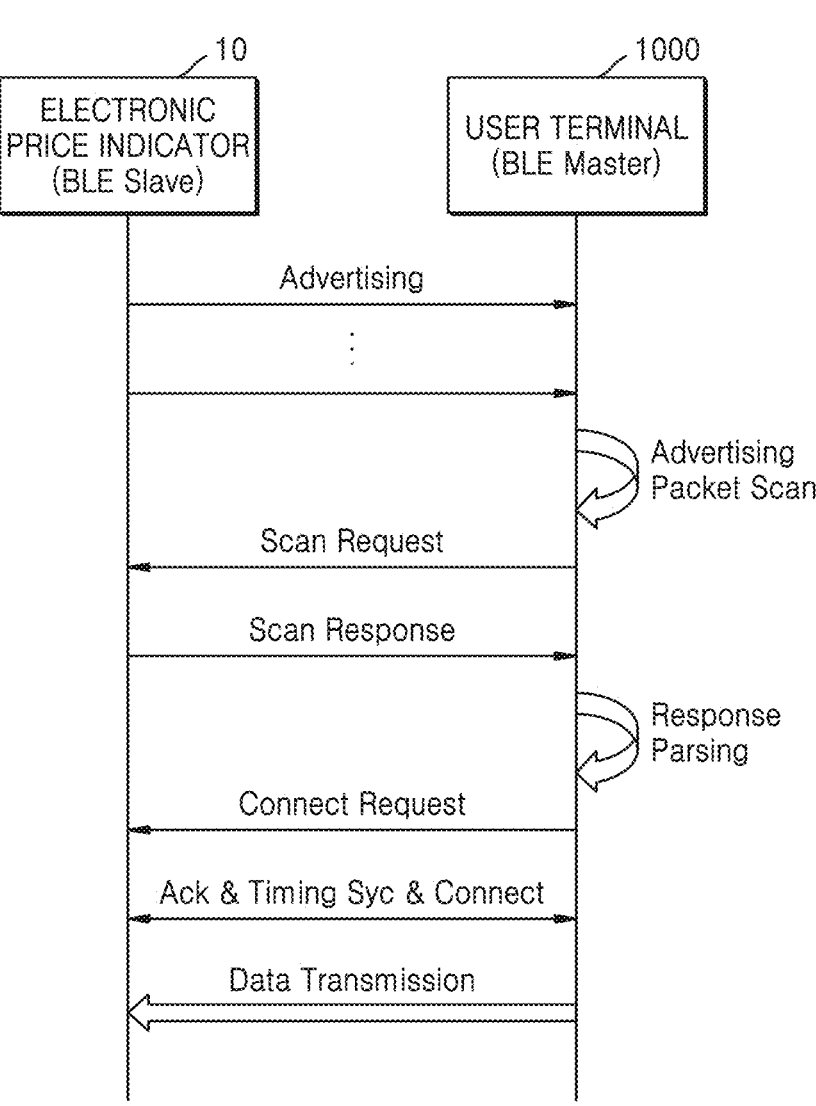
FIG. 4 is a signal flowchart of a communication method between a conventional electronic price indicator and a user terminal.

As shown in FIG. 4, the electronic price indicator 10 operates as a BLE slave, and the user terminal 1000 operates as a BLE master. Accordingly, the electronic price indicator 10 continuously transmits advertising signals to the user terminal 1000.

The electronic price indicator 10 hops an advertising channel and sends an advertising packet. The user terminal 1000 hops the advertising channel and scans the advertising packet. When the user terminal 1000 finds the electronic price indicator 10, the user terminal 100 sends a scan request to obtain additional information about the user terminal 1000.

In response to the scan request, the electronic price indicator 10 transmits a response to the scan request to the user terminal 1000. The user terminal 1000 parses the received scan response and transmits a connection request when connection is desired based on the parsed scan response. Thereafter, acknowledgment between each other is started to synchronize timing information and the like, and connection is completed. Next, the user terminal 1000 transmits data to the electronic price indicator 10.

According to a conventional method, an electronic price indicator needs to periodically perform advertisement to achieve connection. This causes power consumption, and is excessively inefficient during off-peak hours. In addition, the electronic price indicator is subject to interference from other devices conforming to the BLE standard. Because advertisement needs to be performed continuously, unnecessary power consumption occurs.

The electronic price indicator 10 according to an embodiment reduces power consumption of the electronic price indicator 10 by using an NFC module as a trigger for BLE communication. When there is no NFC interrupt, the electronic price indicator 10 enters a power saving state. The power saving state may be the sleep mode.

The user terminal 1000 may fetch the information of the electronic price indicator 10 through the NFC tag, and use the fetched information in BLE communication. During NFC tagging, the user terminal 1000 obtains the MAC address, the type, and the unique connection key of the electronic price indicator 10. During BLE communication, the electronic price indicator 10 operates as a master or a scanner, and the user terminal 1000 operates as a slave or advertiser so that the electronic price indicator 10 has the right for connection.

Figure 3:
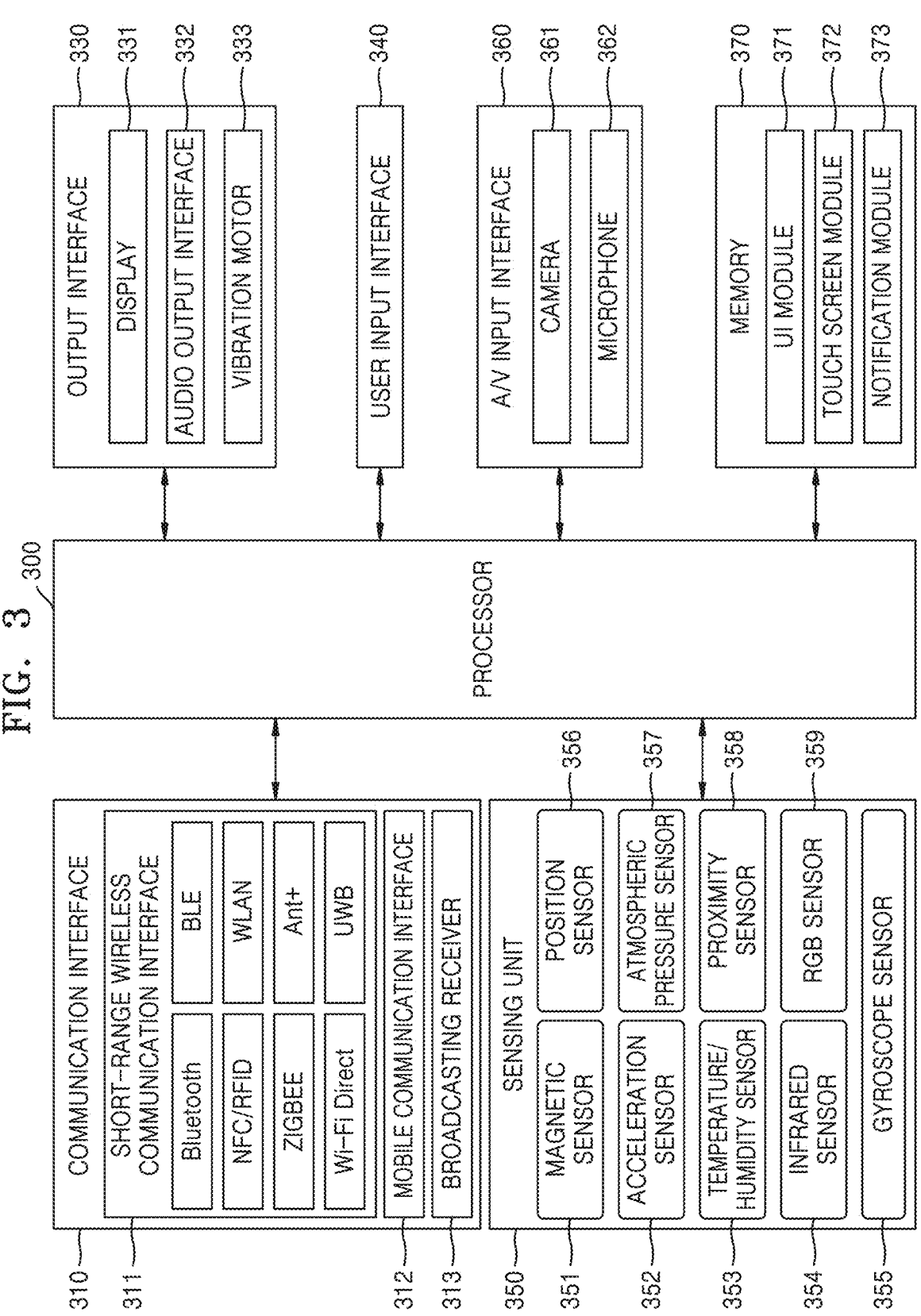
FIG. 3 is a schematic diagram of a user terminal illustrated in FIG. 2.

FIG. 3 is a schematic diagram of the user terminal 1000 illustrated in FIG. 2.

Referring to FIG. 3, the user terminal 1000 may include a processor 300, a communication interface 310, and an output terminal 340. However, not all of the illustrated components are essential. A user terminal may be implemented by more or less components than those illustrated in FIG. 3. For example, a user terminal according to an embodiment may further include a user input interface 340, a sensing unit 350, an audio/video (A/V) input interface 360, and a memory 370, in addition to the processor 300, the communication interface 310, and the output interface 330. According to an embodiment, the user terminal 1000 may transmit or receive information necessary for the electronic price indicator 10 through short-range communication with the electronic price indicator 10 or wired/wireless communication with a store management server (not shown).

The processor 300 typically controls all operations of the user terminal. For example, the processor 300 may control the communication interface 310, the output interface 330, the user input interface 340, the sensing unit 350, the NV input interface 360, and the memory 370 by executing programs stored in the memory 370.

The communication interface 310 may include at least one component that enables communication between the user terminal 100 and a server (not shown). For example, the communication interface 310 may include a short-range wireless communication interface 311, a mobile communication interface 312, and a broadcasting receiver 313.

According to an embodiment, the short-range communication interface 311 includes an NFC module and a Bluetooth module to communicate with an NFC module and a Bluetooth module of the electronic price indicator 10. The short-range wireless communication interface 311 may further include, but is not limited to, a wireless local area network (WLAN) (e.g., Wi-Fi) communication interface, a ZigBee communication interface, an infrared Data Association (IrDA) communication interface, a Wi-Fi direct (WFD) communication interface, an ultra wideband (UWB) communication interface, and an Ant+ communication interface, in addition to a Bluetooth communication interface, a Bluetooth Low Energy (BLE) communication interface, and a near field communication (NFC) interface. The mobile communication interface 312 may exchange a wireless signal with at least one selected from a base station, an external terminal, and a server on a mobile communication network. Here, examples of the wireless signal may include a voice call signal, a video call signal, and various types of data according to text/multimedia message exchange. The broadcasting receiver 313 receives a broadcasting signal and/or broadcasting-related information from an external source via a broadcasting channel. The broadcasting channel may be a satellite channel, a ground wave channel, or the like. According to embodiments, the user terminal may not include the broadcasting receiver 313.

The output interface 330 outputs an audio signal, a video signal, or a vibration signal, and may include a display 331, an audio output interface 332, and a vibration motor 333. The display 331 may include, but is not limited to, a key pad, a dome switch, a touch pad (e.g., a capacitive overlay type, a resistive overlay type, an infrared beam type, an integral strain gauge type, a surface acoustic wave type, a piezo-electric type, or the like), a jog wheel, or a jog switch.

The display 331 may be a touch screen in which a touch pad forms a layer structure. The display 731 may include at least one of a liquid crystal display (LCD), a thin film transistor-liquid crystal display (TFT-LCD), an organic light-emitting diode (OLED), a flexible display, a three-dimensional (3D) display, and an electrophoretic display. According to embodiments of a user terminal, the user terminal may include two or more displays 331.

The audio output interface 332 outputs audio data that is received from the communication interface 310 or stored in the memory 370. The audio output interface 331 also outputs an audio signal (for example, a call signal receiving sound, a message receiving sound, a notification sound) related with a function of the user terminal. The audio output interface 332 may include, for example, a speaker and a buzzer.

The vibration motor 333 may output a vibration signal. For example, the vibration motor 333 may output a vibration signal corresponding to an output of audio data or video data (for example, a call signal receiving sound or a message receiving sound). The vibration motor 733 may also output a vibration signal when a touch screen is touched.

The user input interface 340 denotes a unit via which a user inputs data for controlling the user terminal 1000. For example, the user input interface 340 may be, but is not limited to, a key pad, a dome switch, a touch pad (e.g., a capacitive overlay type, a resistive overlay type, an infrared beam type, an integral strain gauge type, a surface acoustic wave type, a piezo electric type, or the like), a jog wheel, or a jog switch.

The sensing unit 350 may sense the status of the user terminal 1000 or the status of the surrounding of the user terminal 1000 and may transmit information corresponding to the sensed status to the processor 300.

The sensing unit 350 may include, but is not limited thereto, at least one selected from a magnetic sensor 351, an acceleration sensor 352, a temperature/humidity sensor 353, an infrared sensor 354, a gyroscope sensor 355, a position sensor (e.g., a global positioning system (GPS)) 356, a pressure sensor 357, a proximity sensor 358, and an RGB sensor (i.e., an illumination sensor) 359. Functions of most of the sensors would be instinctively understood by one of ordinary skill in the art in view of their names and thus detailed descriptions thereof will be omitted herein.

The A/V input interface 360 inputs an audio signal or a video signal, and may include a camera 361 and a microphone 362. The camera 361 may obtain an image frame, such as a still image or a moving picture, via an image sensor in a video call mode or a photography mode. An image captured via the image sensor may be processed by the processor 300 or a separate image processor (not shown).

The image frame obtained by the camera 361 may be stored in the memory 370 or transmitted to the outside via the communication interface 310. At least two cameras 361 may be included according to embodiments of the structure of a user terminal.

The microphone 362 receives an external audio signal and converts the external audio signal into electrical audio data. For example, the microphone 362 may receive an audio signal from an external device or a speaking person. The microphone 362 may use various noise removal algorithms in order to remove noise that is generated while receiving the external audio signal.

The memory 370 may store a program for processing and control by the processor 300, or may store input/output data.

The memory 370 may include at least one type of storage medium selected from among a flash memory type, a hard disk type, a multimedia card micro type, a card type memory (for example, a secure digital (SD) or extreme digital (XD) memory), a random access memory (RAM), a static random access memory (SRAM), a read-only memory (ROM), an electrically erasable programmable ROM (EEPROM), a programmable ROM (PROM), magnetic memory, a magnetic disk, and an optical disk. The user terminal 1000 may operate a web storage or a cloud server on the Internet which performs a storage function of the memory 370.

The programs stored in the memory 370 may be classified into a plurality of modules according to their functions, for example, a user interface (UI) module 371, a touch screen module 372, and a notification module 373.

The UI module 371 may provide a specialized UI, GUI, or the like that interoperates with a user terminal, according to application. The touch screen module 372 may detect a touch gesture on a touch screen of a user and transmit information regarding the touch gesture to the processor 300. The touch screen module 372 according to an embodiment of the disclosure may recognize and analyze a touch code. The touch screen module 372 may be configured by separate hardware including a controller.

In order to detect an actual touch or a proximate touch on a touch screen, the touch screen may internally or externally have various sensors. An example of a sensor used to detect a touch on the touch screen is a tactile sensor. The tactile sensor denotes a sensor that detects a touch by a specific object to a degree to which a human feels or more. The tactile sensor may detect various types of information, such as the roughness of a touched surface, the hardness of the touching object, and the temperature of a touched point.

Another example of a sensor used to detect the real touch or the proximity touch on the touch screen is a proximity sensor.

The proximity sensor senses the existence of an object that approaches the predetermined sensing surface or an object that exists nearby, without mechanical contact, by using an electromagnetic force or infrared rays. Examples of the proximity sensor include a transmission-type photoelectric sensor, a direct reflection-type photoelectric sensor, a mirror reflection-type photoelectric sensor, a high frequency oscillation-type proximity sensor, a capacity-type proximity sensor, a magnetic proximity sensor, and an infrared-type proximity sensor. Examples of the touch gesture of the user may include tap, touch and hold, double tap, drag, panning, flick, drag and drop, swipe, and the like.

The notification module 373 may generate a signal for notifying that an event has been generated in the user terminal. Examples of the event generated in the user terminal may include call signal receiving, message receiving, a key signal input, schedule notification, and the like. Examples of the event generated in the user terminal may also include generation of a signal informing that a user input has been received, based on a haptic signal that is generated based on a user input received by the display 331.

The notification module 373 may output a notification signal in the form of a video signal via the display 331, in the form of an audio signal via the audio output interface 332, or in the form of a vibration signal via the vibration motor 333.

Figure 5:
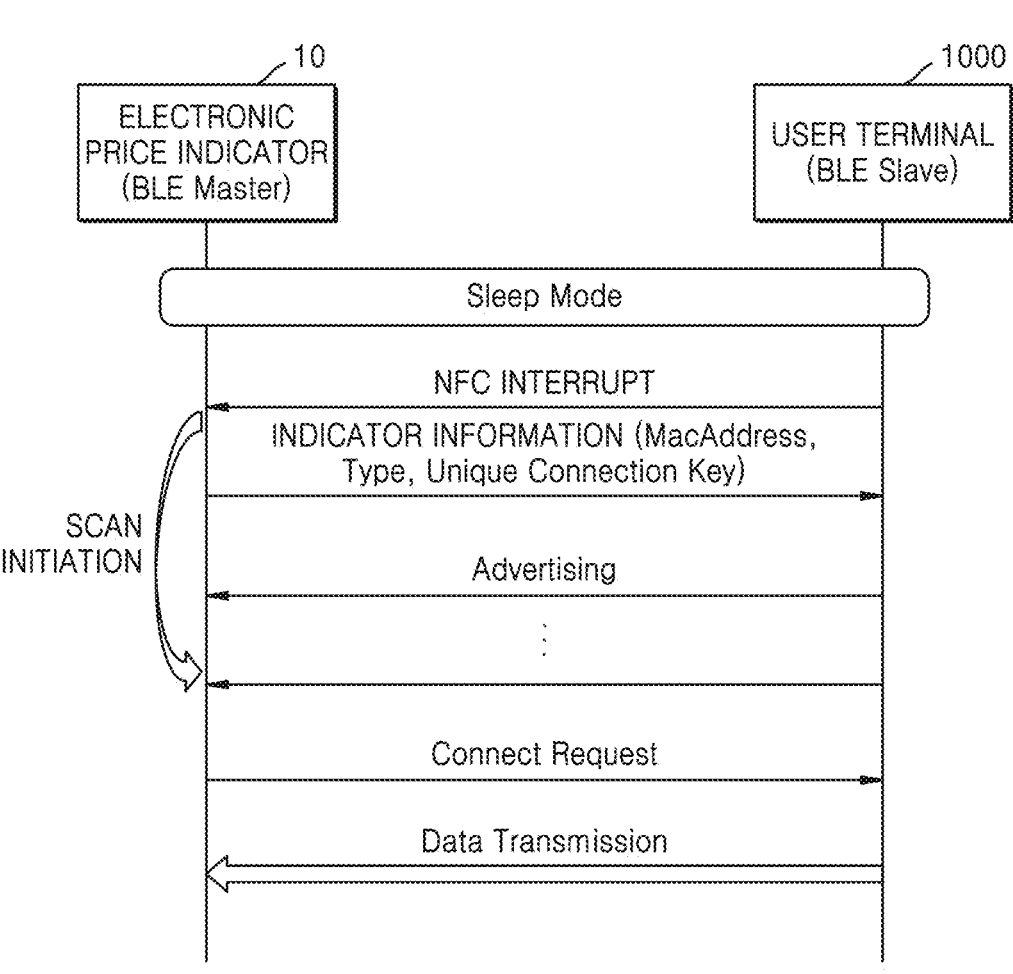
FIG. 5 is a signal flowchart of a communication method between an electronic price indicator according to another embodiment and a user terminal.

FIG. 5 is a signal flowchart of a communication method between an electronic price indicator according to another embodiment and a user terminal.

Referring to FIG. 5, the electronic price indicator 10 operates as a BLE master, and the user terminal 1000 operates as a BLE slave. When the power of the electronic price indicator 10 is turned on, the electronic price indicator 10 maintains a sleep mode.

When an NFC touch or tag is made on the user terminal 1000 and the electronic price indicator 10 releases the sleep mode and triggers a Bluetooth module to scan Bluetooth channels (37, 38, and 39 channels), the module initiates a scan for receiving an advertising signal. When an NFC touch or tag is made on the user terminal 1000, the user terminal 1000 may read information of the electronic price indicator 10, for example, a MacAddress, a Type, and a unique connection Key.

The user terminal 1000 transmits an advertising signal including a read or received unique connection key.

The electronic price indicator 10 scans the received advertising signal to search for a unique connection key. The electronic price indicator 10 transmits a connection request to the user terminal 1000 when the received advertising signal has a unique connection key. When a unique connection key is not found for a certain period of time, the electronic price indicator 10 may return to the sleep mode.

The user terminal 1000 maintains the connection only when information read via NFC tagging, for example, a MacAddress or a tag type, is consistent with information included in the connection request of the electronic price indicator 10, and may terminate the connection.

When the user terminal 1000 maintains the connection request, the user terminal 1000 transmits data to the electronic price indicator 10.

According to an embodiment, when the electronic price indicator 10 is used as a BLE master, scanning rather than advertising may be used, and thus scanning may be performed only for a minimum amount of time, leading to a reduction in battery consumption. When BLE communication is used only at a specific time point, the electronic price indicator 10 may be in a maximal power-saving state until a trigger comes, and thus power consumption may be greatly reduced. Because device information, a MAC address, and a tag type of the electronic price indicator 10 are obtained using NFC communication, unnecessary connection may be prevented and tag information may be known in advance.

A unique connection key may be used in an advertising signal or advertising packet to prevent unnecessary connection attempts and an influence on unidentified user terminals. Unnecessary responses may be avoided from other devices complying with other BLE standard specifications, and, because the user terminal 1000 becomes an advertiser, notification may be used, which is effective for a massive-data transmission speed. Because a subject of the connection becomes the electronic price indicator 10, a flexible function may be implemented.

Figure 6:
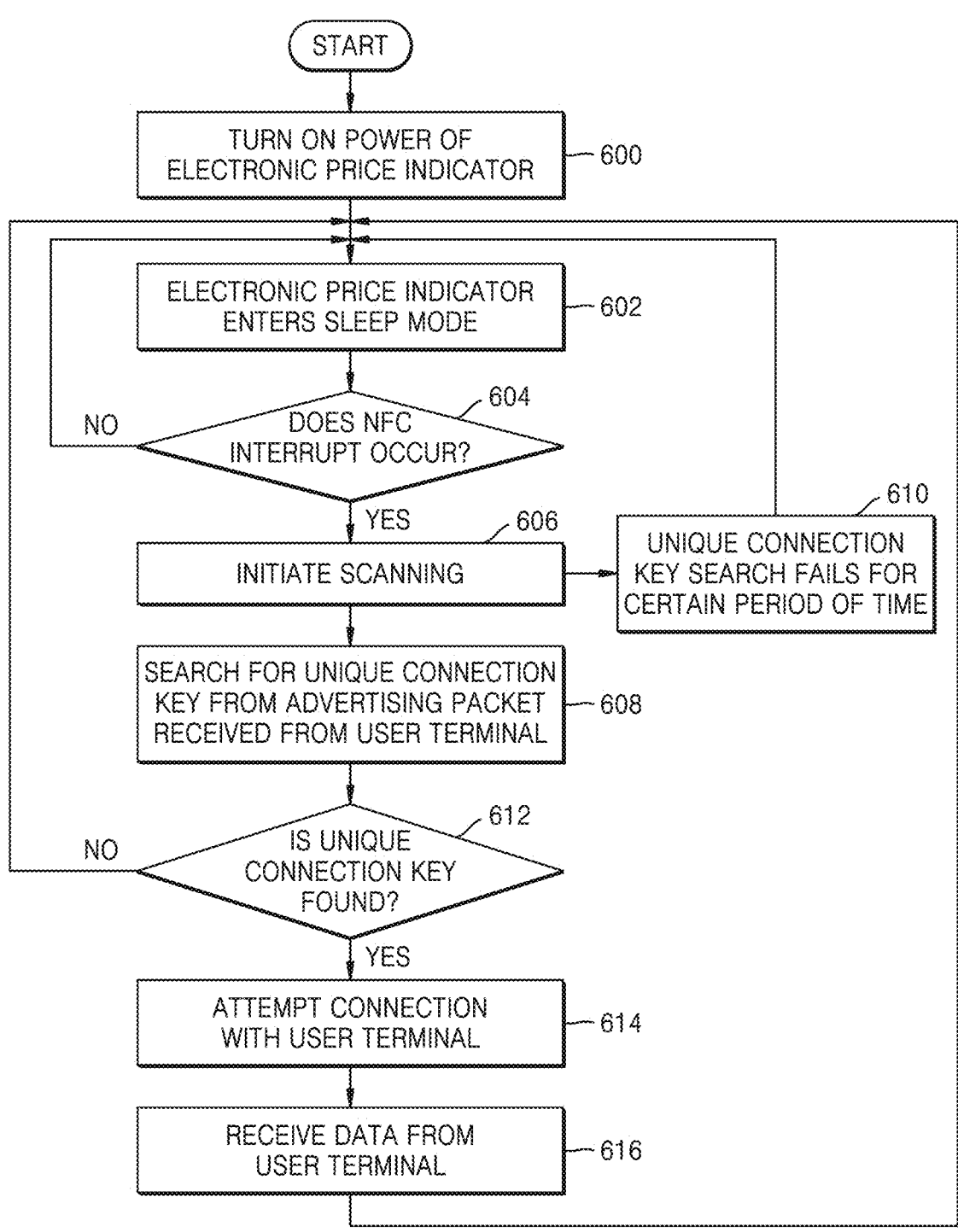
FIG. 6 is a flowchart of a control method of an electronic price indicator according to another embodiment.

FIG. 6 is a flowchart of a control method of an electronic price indicator according to another embodiment.

Referring to FIG. 6, in operations 600 and 602, the power of the electronic price indicator is turned on, and then the electronic price indicator enters a sleep mode.

In operation 604, when an NFC interrupt occurs, the electronic price indicator scans an advertising signal from a peripheral device. In operation 606, the electronic price indicator searches for a unique connection key from an advertising packet received from a user terminal. However, in operation 610, when the unique connection key search fails for a certain period of time, the method returns to operation 602, and the electronic price indicator returns to the sleep mode.

When a unique connection key is found from the advertising packet in operation 612, the electronic price indicator attempts connection with the user terminal in operation 614. On the other hand, when the unique connection key search fails in operation 612, the method goes back to operation 602, and the electronic price indicator returns to the sleep mode.

In operation 616, after receiving data from the user terminal, the electronic price indicator terminates the connection, and the method goes back to operation 602 so that the electronic price indicator returns to the sleep mode.

A control method of an electronic price indicator according to an embodiment can be embodied as a storage medium including instruction codes executable by a computer such as a program module executed by the computer. Computer-readable media may be any available media accessible by a computer and includes both volatile and nonvolatile media and removable and non-removable media. Further, the computer readable medium may include all computer storage and communication media. The computer storage medium includes all volatile/non-volatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes any information transmission medium.

The above description of the embodiments is merely an example, and it will be understood by one of ordinary skill in the art that various modifications and equivalent other embodiments may be made. Therefore, the true scope of protection of the disclosure will be determined by the appended claims, and all differences within the scope equivalent to those described in the claims will be construed as being included in the scope of protection defined by the claims.

The invention claimed is:

1. An electronic price indicator comprising:
a display displaying product information;
a near field communication (NFC) module configured to communicate with a user terminal;
a Bluetooth module configured to communicate with the user terminal; and
a processor configured to control the display to display the product information received from the user terminal through the Bluetooth module,
wherein the processor is further configured to
release a sleep mode when receiving an interrupt from the user terminal through the NFC module, and
perform Bluetooth communication with the user terminal by initiating a scan for a predetermined period of time to receive an advertising signal from the user terminal.

2. The electronic price indicator of claim 1, wherein the processor is further configured to search for a unique connection key included in the advertising signal, and perform a Bluetooth connection with the user terminal, based on a found unique connection key.

3. The electronic price indicator of claim 2, wherein the processor is further configured to return to the sleep mode when the unique connection key is not found from the advertising signal for the predetermined period of time.

4. The electronic price indicator of claim 1, wherein the processor is further configured to transmit information of the electronic price indicator to the user terminal through the NFC module according to the interrupt from the user terminal.

5. The electronic price indicator of claim 4, wherein the information of the electronic price indicator comprises a media access control (MAC) address, a tag type, and a unique connection key.

6. The electronic price indicator of claim 5, wherein the processor is further configured to transmit a connection request to the user terminal when a unique connection key included in the advertising signal from the user terminal is found.

7. The electronic price indicator of claim 6, wherein, when a tag type included in the connection request is consistent with a tag type received through the NFC module, the Bluetooth communication with the user terminal is maintained.

8. The electronic price indicator of claim 6, wherein, when a MAC address included in the connection request is consistent with a MAC address received through the NFC module, the Bluetooth communication with the user terminal maintains is maintained.

9. The electronic price indicator of claim 1, wherein the processor is further configured to generate the interrupt according to an NFC touch of the user terminal, and the generated interrupt triggers the Bluetooth module.

10. A control method of an electronic price indicator, the control method comprising:
    releasing a sleep mode when receiving an interrupt from a user terminal through a near field communication (NFC) module;
    initiating a scan for a predetermined period of time to receive an advertising signal from the user terminal; and
    performing Bluetooth communication with the user terminal.

11. The control method of claim 10, further comprising searching for a unique connection key included in the advertising signal,
    wherein a Bluetooth connection with the user terminal is performed based on a found unique connection key.

12. The control method of claim 11, further comprising, when the unique connection key is not found from the advertising signal for the predetermined period of time, returning to the sleep mode.

13. The control method of claim 11, further comprising, when the unique connection key included in the advertising signal from the user terminal is found, transmitting a connection request to the user terminal.

14. The control method of claim 13, wherein, when a tag type included in the connection request is consistent with a tag type received through the NFC module and a MAC address included in the connection request is consistent with a MAC address received through the NFC module, the Bluetooth communication is maintained.

15. A computer-readable recording medium having recorded thereon a program for executing the control method of an electronic price indicator of claim 10.

* * * * *